(12) United States Patent
de Groot

(10) Patent No.: US 6,208,424 B1
(45) Date of Patent: *Mar. 27, 2001

(54) INTERFEROMETRIC APPARATUS AND METHOD FOR MEASURING MOTION ALONG MULTIPLE AXES

(75) Inventor: Peter J. de Groot, Middletown, CT (US)

(73) Assignee: Zygo Corporation, Middlefield, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,096

(22) Filed: Aug. 27, 1998

(51) Int. Cl.[7] ................................................ G01B 9/02
(52) U.S. Cl. ...................... 356/500; 356/493; 356/486; 356/498
(58) Field of Search .................................. 356/354, 357, 356/359, 351

(56) References Cited

U.S. PATENT DOCUMENTS

| | | |
|---|---|---|
| 3,661,464 * | 5/1972 | Hubbard ............................. 356/4.09 |
| 4,948,254 | 8/1990 | Ishida . |
| 5,615,011 * | 3/1997 | Boisrobert et al. .................. 356/345 |
| 5,748,315 | 5/1998 | Kawai et al. . |

OTHER PUBLICATIONS

Zanoni, C., Differential Interferometer Arrangements for Distance and Angle Measurements: Principles, Advantages, and Applications, VDI Berichte NR. 749, 1989.

Bennett, S. J., A Double–Passed Michelson Interferometer, Optics Communications, vol. 4, No. 6, 1972.

Ishida, A., Two–Wavelength Displacement Measuring Interferometer To Eliminate Air–Turbulence–Induced Error, J. Appl. Phys., 28(3), (1989), 1473–475.

* cited by examiner

Primary Examiner—Robert Kim
(74) Attorney, Agent, or Firm—Francis J. Caufield

(57) ABSTRACT

Interferometric apparatus and method by which polarization effects and stage yaw and pitch are substantially reduced. A beam redirecting means selected from the group consisting of corner mirrors, prisms, diffractive elements, holographic elements, and combinations thereof are fixedly mounted on a body capable of rectilinear motion for movement therewith. The measurement beam path to and from the redirecting means is folded at least once so that incoming and outgoing beam segments are spatially separated and substantially parallel to one another and the reference beam.

54 Claims, 7 Drawing Sheets

INTERFEROMETRIC APPARATUS AND METHOD FOR MEASURING MOTION ALONG MULTIPLE AXES

BACKGROUND OF THE INVENTION

The present invention generally relates to optical configurations for interferometers and more particularly to interferometers and methods for use with translation stages having rectilinear motions.

An important family of commercially available displacement measuring interferometers (DMI) encompasses optical configurations compatible with translation stages, particularly those used for displacement primarily along X-Y and directions of travel. Typically, such interferometers rely on polarization encoding to distinguish between reference and measurement beams as they travel along the various optical paths of the interferometer. However, the presence of polarizing elements themselves account for errors that impact on accuracy and precision. Future requirements for such interferometers, most notably those intended for use in microlithography applications, will require enhanced accuracy and precision to keep pace with the ever increasing demand for fabricating smaller scale features in microelectronic devices.

Thus the invention seeks to reduce error sources by reducing the number of polarization-dependent components from the optical geometry found in many current interferometers. Such improvements will significantly reduce the possibility for several types of polarization mixing errors, and facilitate multiple wavelength operation. It may also prove useful for linear stage applications, as well as for other types of stages.

Because of the predominant motion of two-dimensional motion of X-Y stages, the measurement beams are returned to associated interferometers by means of plane mirrors rather than retroreflectors. One of the challenges in designing plane-mirror interferometers is how to accommodate the changing pitch and yaw angles of the stage. The angle ranges are typically ±1 mrad, which is too large for a simple Michelson type single-pass interferometer.

The standard technique for accommodating stage-mirror pitch and yaw is to double pass the interference beam, so that the mirror angles are passively compensated. This approach has several advantages, as can be witnessed by the near universal acceptance of this interferometer design, both in the differential and high-stability embodiments (C. Zanoni, "Differential interferometer arrangements for distance and angle measurements: Principles, advantages and applications," VDI Berichte Nr. 749, p.93 (1989)). The "high stability" configuration invented by Bennett is a common type of plane mirror interferometer commercially marketed (S. J. Bennett, "A double-passed Michelson interferometer," Optics Communications, 4(6), 428–430 (1972).).

Plane mirror interferometers nonetheless have fundamental drawbacks related to the overlap of the incident and reflected measurement beams propagating to and from the plane mirror. The normal means of distinguishing between the two propagation directions is by polarization, using combinations of waveplates and cube beam splitters. Defining beam paths using polarization depends strongly on the quality of the polarization components. This is particularly true of wave plates. Affordable wave plates such as mica have a retardance tolerance of 125 mrad ($\lambda$/50). The residual elliptical polarization after double passing results in a 12.5% leakage of the wrong polarization state into the interferometer. Quartz wave plates are much better at 12.5 mrad ($\lambda$/500), but they are expensive and the residual leakage of 1.25% is still significant.

Errors in polarization encoding lead to errors in the measured displacement that are typically cyclic in nature. A common difficulty related to the wave plates is multiple passing error, which contributes several nm of cyclic nonlinear behavior. The periodicity of the error is one eighth of a wavelength in a double-pass plane mirror interferometer.

The problems with polarization encoding become even more significant when designing optics for multiple-wavelength dispersion interferometry, as has been proposed for air turbulence compensation (A. Ishida, "Two wavelength displacement-measuring interferometer using second-harmonic light to eliminate air-turbulence-induced errors," 28, 473–475 (1989)). The difficulties in manufacturing the waveplates compatible with two distinct wavelengths are compounded by the amplifying effect of the air-turbulence compensation method. Depending on the wavelengths employed, the magnitude of cyclic errors is amplified by 10X to 100X. Thus cyclic errors as large as 100 nm are possible with dispersion interferometry. An object of the invention, therefore, is to provide a means of measuring displacement of an X-Y stage without relying on polarization encoding to distinguish between the incident and reflected portions of the measurement beam.

Accordingly, it is a primary object of the present invention to provide interferometer architectures that have a reduced dependence on polarization elements.

It is another object of the present invention to provide distance-measuring interferometers for use with translation stages that undergo rectilinear motion.

It is yet another object of the present invention to provide distance measuring interferometers that are relatively insensitive to the yaw and pitch that may be present in translation stages.

Yet another object is to provide an interferometer for measuring angles or tilt.

Still another object of the present invention is to provide a distance measuring interferometer for operation at two or more wavelengths.

Other objects of the invention will in part be obvious and will in part appear hereinafter when the detailed description to follow is read in connection with the drawings.

SUMMARY OF THE INVENTION

The present invention generally relates to optical configurations for interferometers and more particularly to interferometric apparatus and methods for use with translation stages having rectilinear motions. The inventive apparatus can measure stage motion for one direction of stage travel while accommodating any pitch and yaw of the stage.

The interferometric apparatus comprises beam-redirecting means adapted to be fixedly mounted to a body for movement therewith in at least two orthogonal directions; and optical means for:

(a) forming a reference path for a reference beam;

(b) in combination with said beam redirecting means, forming a measurement path for a measurement beam having at least one incoming and one outgoing segment that travel, respectively, to and from said redirecting means and are spatially separated from one another, said measurement path changing in length as the body moves along a select one of said two orthogonal directions and being spatially separated from said reference path;

(c) introducing reference and measurement beams for travel along said reference and measurement paths, respectively; and (d) combining said reference and said measurement beams so that they are coextensive and have a predetermined angle between them to generate an interference signal that varies in accordance with changes in said measurement path, said redirecting means being configured and arranged with respect to said optical means so that said reference and measurement beams remain substantially coextensive with said predetermined angle between them as the body moves both along said select direction and orthogonal to said select direction.

The beam redirecting means is selected from the group consisting of roof mirrors, prisms, diffractive elements, holographic elements, and combinations thereof, and on preferred form comprises a roof mirror having plano reflecting surfaces arranged at 90 degrees with respect to one another.

The optical means comprises at least a pair of reflecting elements selected from the group consisting of roof mirrors, retroreflectors, diffractive elements, and holographic elements where in preferred form the pair of reflecting elements comprise a pair of retroreflectors one of which, in one embodiment combines with a polarizing beam splitter to comprise the reference path and the other of which, in the same embodiment, combines with the polarizing beamsplitter and the beam redirecting means to, comprise the measurement path. The part of the optical means for combining the reference and measurement beams comprises at least one element that operates so that the reference and measurement beams are coextensive and have a predetermined angle between them to generate an interference beam. The interferometric apparatus may further include an X-Y translation stage to which the beam redirecting means is fixedly attached for movement therewith and a means for moving said X-Y translation stage.

The interferometric apparatus may also further include polarization-encoded laser heterodyne means for generating at least two substantially coextensive and parallel beams of radiation for travel along said reference and said measurement paths, respectively wherein the beams of radiation may be orthogonally polarized with respect to one another and differ in frequency. The means for generating the orthogonally polarized reference and measurement beams preferably comprises a laser and a modulator for shifting the frequency of at least a portion of the output of the laser.

For this specific case of a polarization-encoded heterodyne laser source, the optical means comprise at least one polarization beam splitting element for separating the orthogonally-polarized components of the heterodyne laser source into two spatially-distinct beams corresponding to said reference and measurement beams. The optical means for this case also comprise optical mixing means for the reference and measurement beams, preferably a plane polarizer oriented at 45 degrees with respect to the polarization axes of the reference and measurement beams and a detector at the output end of said 45 degree plane polarizer.

In one preferred aspect of the invention a selected portion of the optical means comprises and integrated assembly consisting of a prismatic polarizing beamsplitter having a plurality of facets to one of which is affixed a retroreflector that at least in part forms the reference path and to another of which is affixed another retroreflector that at least in part forms the measurement path.

Alternative embodiments utilizing roof mirrors, multiple wavelength sources, and multiple pass interferometry, and a method are also disclosed. Homodyne and heterodyne signal processing may be practiced in the invention.

BRIEF DESCRIPTION OF THE DRAWINGS

The structure and operation of the invention, together with other objects and advantages thereof may best be understood by reading the detailed description in connection with the drawings in which unique reference numerals have been used throughout for each part and wherein.

DETAILED DESCRIPTION

The present invention generally relates to interferometric apparatus and methods for measuring distances and in particular to interferometric apparatus for precisely measuring small changes in distance of the type encountered, by way of example, in the rectilinear movement of microlithographic scanner and precision linear motors.

Figure 1:
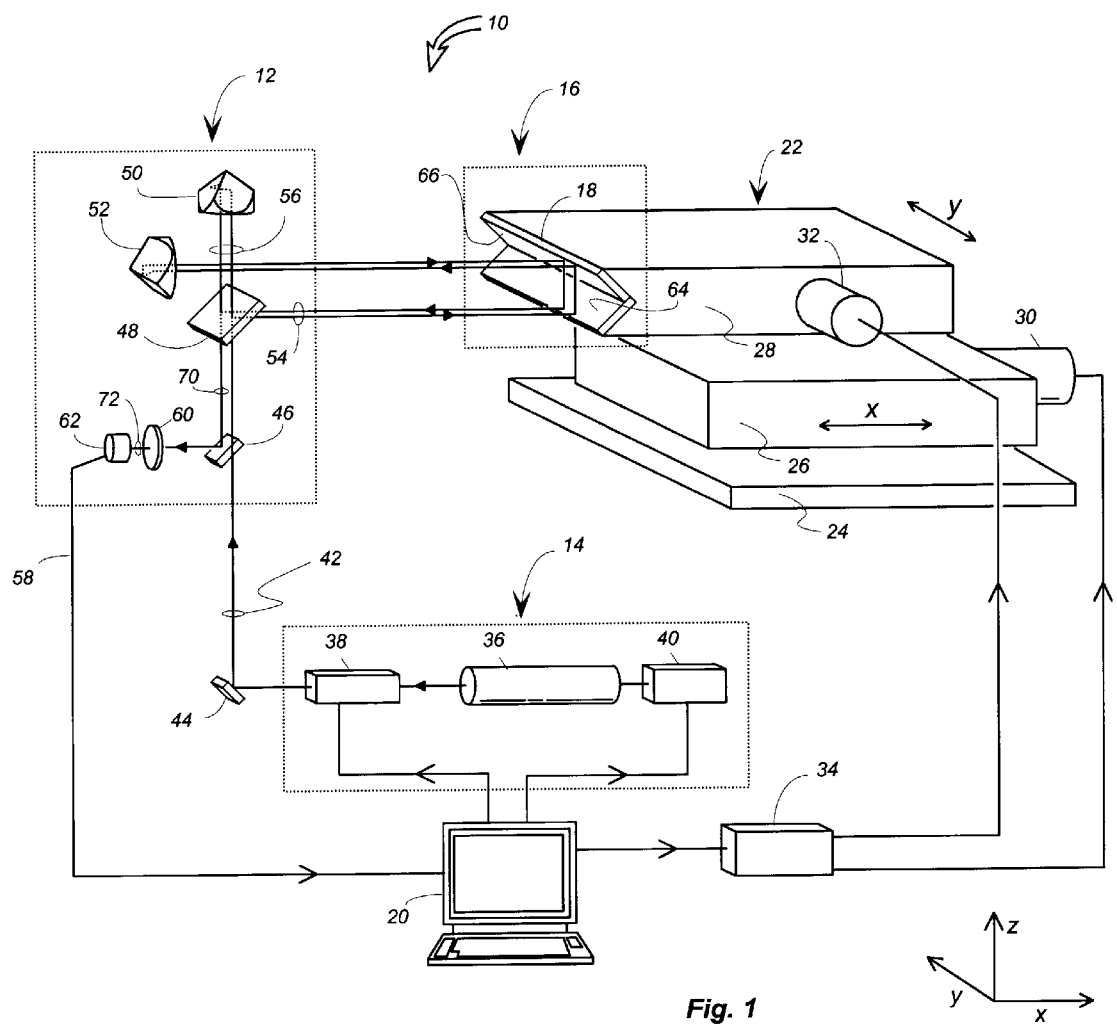
FIG. 1: is a diagrammatic perspective view of an apparatus of the invention.

Referring now to FIG. 1, there is shown generally at 10 an interferometric apparatus of the invention. As seen there, apparatus 10 comprises an optical assembly or means 12, a radiation source or means 14, and a beam redirecting means 16, preferably in the form of a roof mirror 18. A computer 20 or other suitable microprocessor is provided in a well-known manner for overall system control, implementation of algorithms, and numerical calculation.

Roof mirror 18 is preferably rigidly affixed to a conventional X-Y translation stage 22 (more generally a body with rectilinear motion) for movement therewith. Translation stage 22 comprises a base 24 on which is mounted a plate 26 adapted for movement in the X-direction and a plate 28 adapted for movement in the Y-direction. Plate 26 is mounted to base 24 via air bearings, and plate 28 is mounted to plate 26 via air bearings. Plate 26 is precisely moved in the X-direction via a precision linear motor 30 that is controlled via a motor controller 34 electronically linked to computer 20. Likewise, plate 28 is precisely moved with respect to plate 26, and thus base 24, via a precision linear motor 32 that also receives instructions via motor controller 34, again from computer 20. Translation stage 22 typically forms part of a precision microlithographic stage, as will be explained more fully hereinafter, where it is possible for angular pitch (rotation about the Y-axis) and yaw (rotation about the Z-axis) changes to be present as translation stage 22 experiences X and Y motion. As will be seen, the present inventive apparatus accommodates such angular effects in an improved manner with respect to the prior art, thus removing a significant source of imprecision that is typically otherwise present in the fabrication of microelectronic devices.

Radiation source 14 preferably comprises a laser 36, a heterodyne modulation system 38 and a laser controller 40; heterodyne modulation system 38 and laser controller 40 being linked to computer 20 to provide an orthogonally polarized heterodyne beam 42 that travels upwardly to optical means 12 via a mirror 44. An exemplary heterodyne modulation system is provided in U.S. Pat. No. 4,684,828 to G. E. Sommargren. The orthogonally polarized components of beam 42 are of different frequency for facilitating subsequent downstream heterodyne signal processing. One of the orthogonally polarized components of beam 42 serves as a reference beam and one as a measurement beam as will be seen.

Optical means 12 comprises a fold mirror 46, a polarizing beamsplitter 48, a first retroreflector 50 that sits above polarizing beamsplitter 48, and a second retroreflector 52 that sits slightly above and to the left of polarizing beamsplitter 48. Further included are a mixing polarizer 60 and a photodetector 62.

Polarizing beamsplitter 48 splits beam 42 into two orthogonally beams 54 and 56. Beam 56 is preferably of p-polarization and serves as the reference beam for apparatus 10 while beam 54 is preferably of s-polarization and serves as the measurement beam for apparatus 10.

After reference beam 56 leaves polarizing beamsplitter 48, it proceeds to retroreflector 50 where it is redirected for travel back to polarizing beamsplitter 48 except along a path of travel that is spatially separated from its incident path but parallel to it. After passing through polarizing beamsplitter 48 for the second time, beam 56 will have been combined with measurement beam 54 in a manner to be seen after which both are reflected from fold mirror 46 for travel to mixing polarizer 60 and subsequently to detector 62.

Measurement beam 54 is directed by polarizing beamsplitter 48 toward roof mirror 18 along the measurement path which is folded a number of times. As can be seen, beam 54 initially is reflected upwardly from a lower facet 64 to an upper facet 66. In this manner, measurement beam is directed via roof mirror 18 along a path of travel that is spatially separated from it initial direction and substantially parallel to it. After this first reflection from facet 66, measurement beam 54 is directed to retroreflector 52 which redirects it along a path of travel that is spatially separated but parallel to it incoming direction. Retroreflector 52 operates to direct measurement beam 54 back to roof mirror 18 where it impinges on facet 66 at a Y-location that is laterally spatially separated with respect to its initial Y-location on roof mirror 18. Afterwards, facet 66 directs measurement beam 54 downwardly to facet 64 which redirects it for travel to polarizing beamsplitter 56 such that measurement beam 54 is combined with reference beam 56 so that both travel to beamsplitter 46 as a combined beam 70. Combined beam 70 thus has coextensive components consisting of reference beam 56 and measurement beam 56 which travel along a common path such that there is a predeteremined angle between them. As mentioned earlier, fold mirror 46 redirects beam 70 to mixing polarizer 60 that operates to generate an interference beam 72 Interference beam 72 is sent to photo-detector 62 that operates in a well-known manner to produce an electrical heterodyne signal 58, the phase of which varies in accordance with changes in the measurement path of apparatus 10. Electrical heterodyne signal 58 is sent to computer 20 for analysis via well-known algorithms which extract the change in position of X-Y translation stage 22 along the X-direction.

It will be appreciated that the optical means 12 perform a number of functions including those of:

(a) forming a reference path for a reference beam;

(b) in combination with said beam redirecting means 16, forming a measurement path for a measurement beam having at least one incoming and one outgoing segment that travel, respectively, to and from said redirecting means and are spatially separated from one another, said measurement path changing in length as the body moves along a select one of said two orthogonal directions and being spatially separated from said reference path;

(c) introducing reference and measurement beams for travel along said reference and measurement paths, respectively; and (d) combining said reference and said measurement beams so that they are coextensive and have a predetermined angle between them to generate an interference signal that varies in accordance with changes in said measurement path, said redirecting means being configured and arranged with respect to said optical means so that said reference and measurement beams remain substantially coextensive with said predetermined angle between them as the body moves both along said select direction and orthogonal to said select direction.

As can be appreciated, the invention replaces the usual plane mirror attached to the X-Y stage with a corner mirror. A corner mirror is a pair of plane mirrors at 90°, as shown in FIG. 1. This configuration is the same as a right angle or roof prism, and behaves like a retroreflector in two dimensions. The measurement beam reflection angle is independent of stage pitch. Stage yaw changes the measurement beam angle, but the double pass involving fixed retroreflector 52 cancels this effect. An important characteristic of the inventive interferometer is that it does not require any waveplates. The incident and reflected portions of the measurement beam are physically separated. The same is true for the reference beam, which is also spatially separated with respect to the measurement up to the point of recombination. The critical portions of the interferometer apparatus are reflective components (mirrors) that are easily fabricated for multiple wavelengths.

Another attractive feature of this configuration is that it is relatively insensitive to certain forms of beam sheer error that are common with plane mirror interferometers. For example, if the stage pitches (rotates about an horizontal axis), the measurement beam does not change angle. This is not the case with plane mirror interferometers, for which the change in angle is multiplied by the distance between the stage and the interferometer, resulting in a variable beam shear as the stage changes in pitch angle.

The angle tolerance for the retroreflectors is that of a good quality hollow retroreflector, namely, <10 $\mu$rad (2 sec)., Because double passing in combination with a retroreflection cancels errors in roof mirror 18, relaxed tolerances may be used to fabricate this component.

There are other ways to implement the inventive concept. In essence, the invention covers any replacement of the plane mirror by a prism or mirror assembly that results in a physical separation of the incident and reflected beams in an X-Y interferometer. Included here are Porro prisms, diffractive elements, holographic elements, or combinations thereof.

Figure 2:
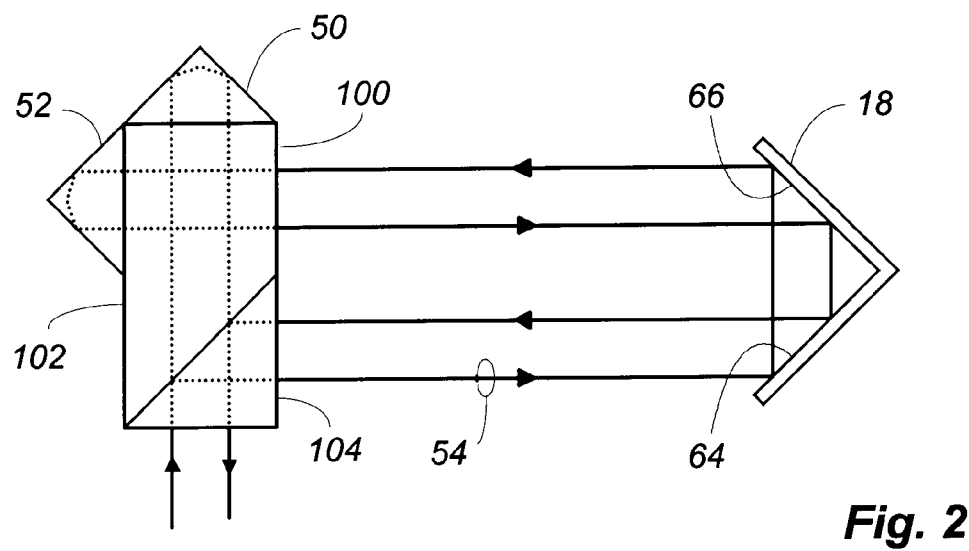
FIG. 2 is a plane elevation of an alternative arrangement for certain components of the apparatus of FIG. 1.
Figure 3:
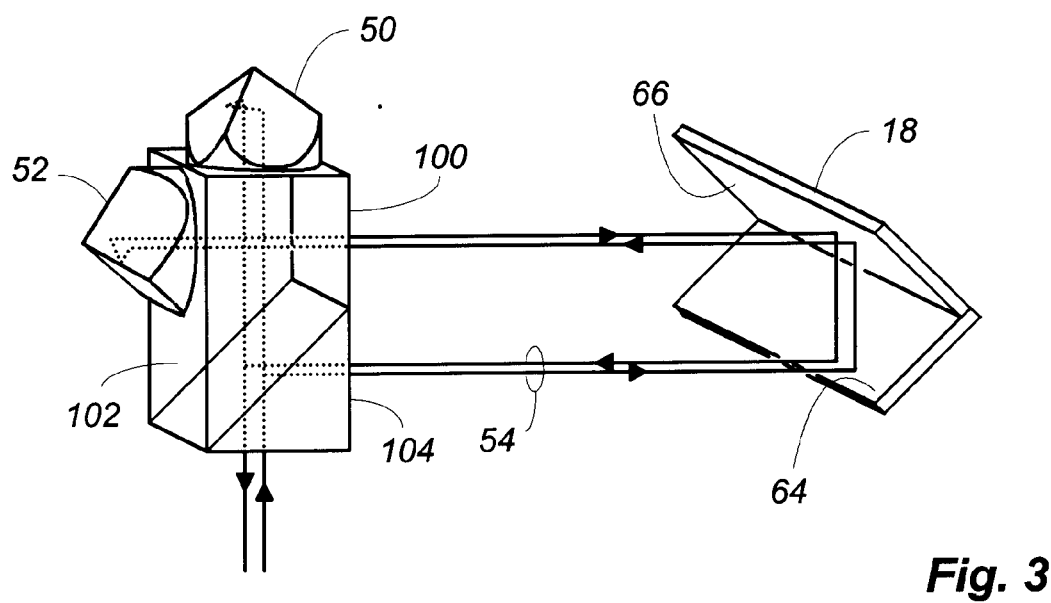
FIG. 3 is diagrammatic perspective of the alternative arrangement of FIG. 2.

To ease fabrication, assembly, alignment, and operation, a preferred way of combining various parts shown in FIG. 1 is shown FIGS. 2 and 3. Here, the polarizing beamsplitter function is provided in the form of a prismatic component consisting of a pair of prisms 102 and 104 mated at an interface 106 that is in the form of appropriate coating layers. Retroreflector 50 sits on the top facet of prism 102, and retroreflector 52 on its left side facet to provide an integrated assembly into which the needed fabrication tolerances are built to assure precision alignment. Final alignment of the reference and measurement beams may be achieved in any well known manner through the use of a visual monitoring system or by monitoring the intensity of the interference signal for maximum strength. This would assure the co-extensiveness required to provide a useful interference signal.

Figure 4:
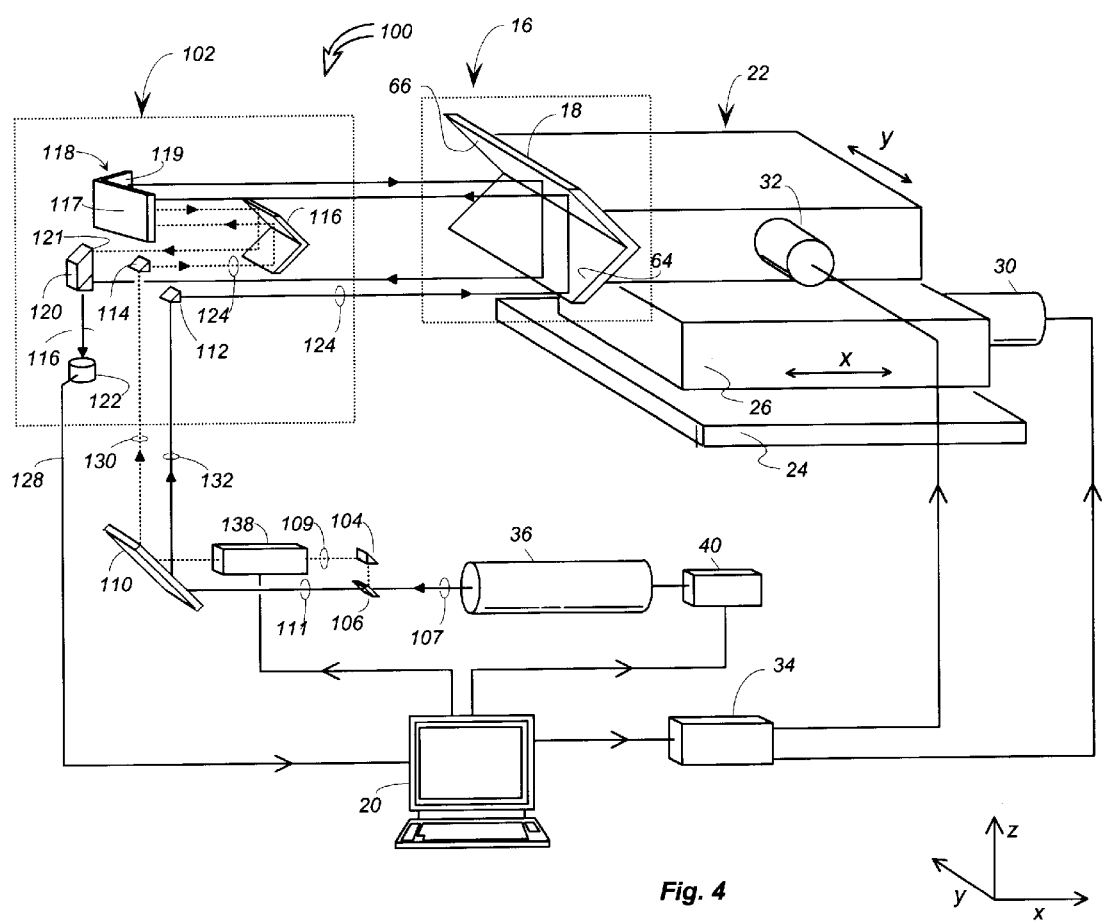
FIG. 4 is a diagrammatic perspective view of an alternative apparatus of the invention.

An alternative embodiment of the invention employing primarily roof mirrors is shown in FIG. 4 where the inventive interferometric apparatus is generally designated at 100. Here, the optical means corresponding to those of the embodiment of FIG. 1 are designated generally at 102. Other components are common with those shown in FIG. 1 and are repeated here with the same numerical identifiers. The primary differences between this embodiment and that of FIG. 1 reside in the arrangement of components comprising optical means 102, the fact that the reference and measurement beams are spatially separated until combined as an interference signal, and the use of roof mirrors instead of retroreflectors. Computer 20, laser 36, modulator 38, the X-Y translation stage 22 and its associated controllers and motors remain unchanged for this embodiment. Because this embodiment uses roof mirrors throughout, it is relatively more difficult to construct than that of FIG. 1 because of the increased angular tolerances for all of the roof mirrors.

Here, optical means 102 comprises roof mirrors 116 and 118. Roof mirror 116 and 118 are fixed relative to X-Y translation stage and in combination are primarily responsible for providing the reference path of apparatus 100. Roof mirror 118 in combination with moving roof mirror 18 are primarily responsible for providing the measurement path of apparatus 102.

A reference beam 130 and a measurement beam 132 are provided by splitting output beam 107 of laser 36 with a beamsplitter 106 to provide beams 109 and 111. A fold prism 104 directs beam 109 to an acousto-optic modulator 138 that operates to alter its frequency by a predetermined amount to facilitate subsequent downstream heterodyne processing. After emerging from acousto-optical modulator 138 reference beam 130 is directed upwardly via a fold mirror 110. Beam 111 is similarly directed upwardly as measurement beam 132, which is spatially separated from reference beam 130.

Reference beam 130 is directed by a prism 114 to the lower facet of roof mirror 116 which directs it upwardly to the upper facet of roof mirror 116 after which it travels to the lower portion of a right facet 117 of a roof mirror 118. From right facet 117, reference beam 130 is directed to a left facet 119 from which it is reflected to the upper facet of roof mirror 116, then to the lower facet, and then to an entrance face 121 of prismatic beam combining element 120.

Measurement beam 132 is directed to lower facet 64 of corner mirror 18 via a prism 114. Afterwards, lower facet 64 directs measurement beam 132 to upper facet 66 which in turn directs its to the upper region of right facet 117 after which it is directed to left facet 119 and then again back to upper facet 66 of corner mirror 18, but laterally spatially separated compared with the first time that it impinged on corner mirror 18.

Afterwards, measurement beam 132 is directed downwardly to facet 64 which then directs it back to entrance facet 121 of prismatic combining element 120.

In prismatic combining element 120, reference beam 130 and measurement beam 132 are combined so that their energy flux profiles become sufficiently coextensive to operate as an interference beam 126 that has a predetermined angle between its reference and measurement beam components. Interference beam 126 is sent along to photodetector 122 where it is converted to a heterodyne electrical signal 128 that is sent to computer 20 for signal processing in a well-known manner to extract information about changes in the length of the measurement path. Apart from the relatively more difficult fabrication requirements for this embodiment, it operates in principle the same as does the embodiment of FIG. 1. Here, however, roof mirror 118 is common to both reference and measurement paths.

There are also derivative embodiments for measuring displacement and angle simultaneously. For example, a pair of interferometers stacked one next to the other could measure the yaw angle of the stage as well as its displacement. An example of such a system is shown as a block diagram in FIG. 5 where it is generally designated as interferometric apparatus 200. Here, an X-Y translation stage 201 is provided with a beam redirecting means 202 preferably in the form of a roof mirror. Motion of stage 201 is controlled via a controller 212 liked to a computer 210. A source of radiation 208, also under the control of computer 210 provides reference and measurement beams to identical optical means 204 and 206 similar in design to that of the optical means 12 of FIG. 1. Optical means 206 has a measurement beam 216, and optical means 204 a measurement beam 218. Measurement beams 216 and 218 are laterally displaced with respect to one another along the Y-direction of corner mirror 202. As such, optical means 204 and 206 provide information about the displacement and thus angular difference between the respective areas with which they interact with corner mirror 202. Optical means 204 produces an interference beam 222 and 206 and interference beam 220. Interference beams 220 and 222 are converted into heterodyne signals by suitable electronics 214 the output of which is designated generally as signal 224. Electronics 214 may be a single unit as shown, or two separate electronic systems with separate outputs. Signal 224 is processed in the usual way by computed 210 to provide changes about the respective measurement paths and thus the angle between them.

Figure 5:
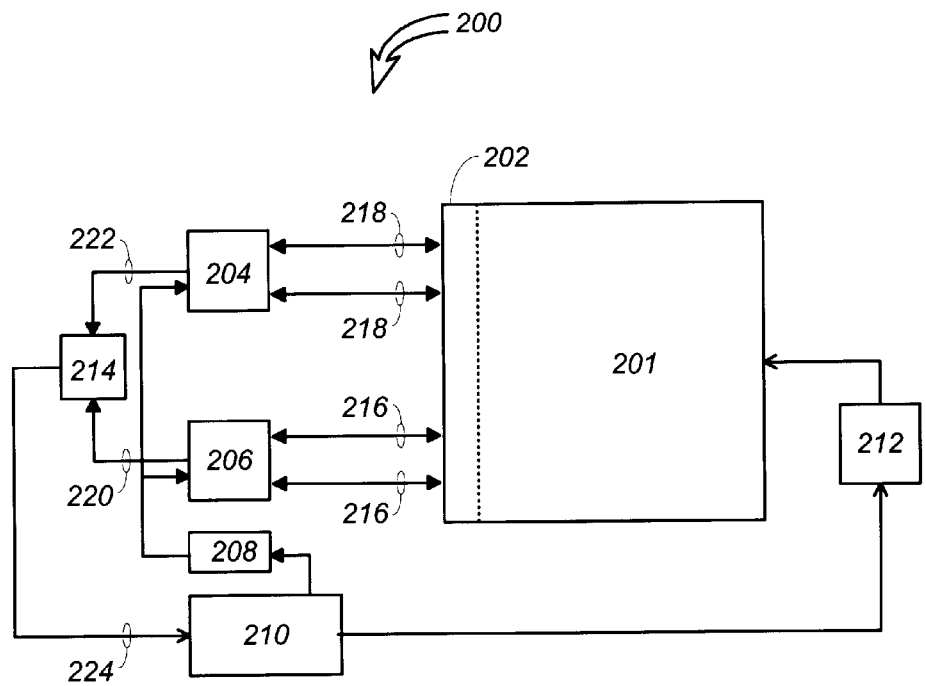
FIG. 5 is a block diagram of an embodiment of the invention for measuring both translation and rotation of a moving body.

It would be obvious to one skilled in the art that an arrangement similar to that of FIG. 5 may be provided to measure pitch angle, provided that two roof mirrors are affixed one over the other to stage 201, together with corresponding optical means.

It will also be apparent to one skilled in the art that an arrangement similar to that of FIG. 5 can be modified to measure motion along both X and Y- directions. For this application, optical means 204, and thus measurement beam 218, can be directed at translation stage 201 along the Y-axis, instead of along the X-axis as currently appearing. Also, another beam redirecting means similar to that at 202 would be affixed to translation stage 201 with its longitudinal axis parallel to the X-direction to intercept reoriented measurement beam 218. In this manner, measurement beam 216 would measure X motion while measurement beam 218 would measure Y motion. Obviously, angular displacement could be incorporated by adding an additional optical means for measuring X or Y motion at different locations along the beam redirecting means as in FIG. 5.

Figure 6:
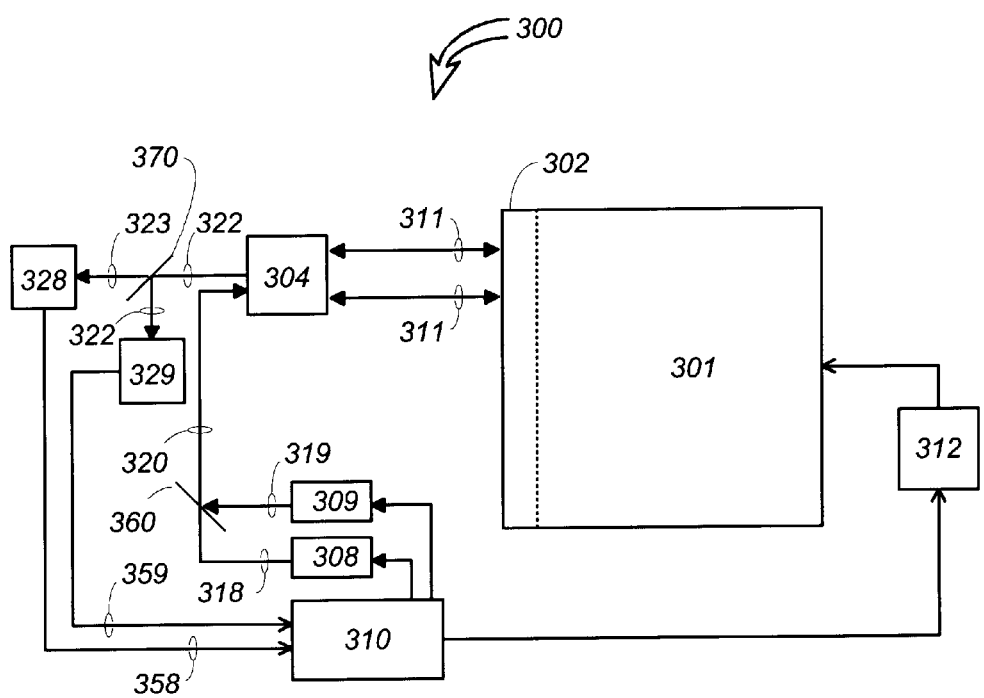
FIG. 6 is a block diagram of an embodiment employing two radiation sources at different wavelengths within the same inventive apparatus.

FIG. 6 illustrates an arrangement, generally designated as interferometric apparatus 300, in which two wavelengths may be employed simultaneously within the inventive apparatus to practice dispersion interferometry to compensate for refractive index fluctuations in the measurement path. Here, an X-Y translation stage 301 is provided with a beam redirecting means 302 preferably in the form of a roof mirror, properly coated to function as an efficient reflector at least two wavelengths. Motion of stage 301 is controlled via a controller 312 linked to a computer 310. A first radiation source 308, also under the control of computer 310 provides reference and measurement beams to optical means 304. A second radiation source 309, also under control of computer 310, also provides reference and measurement beams to optical means 304, but at a different wavelength than that of radiation source 308. Beams 319 and 318 from radiation sources 308 and 309 combine into a beam 320 by means of dichroic (i.e. two-wavelength) beamsplitter 360. Optical means 304 is similar in design to that of the optical means 12 of FIG. 1, although optical means 304 are specifically designed to operate efficiently at two wavelengths. A portion of beam 320, comprising light from radiation sources 308 and 309, becomes measurement beam 311.

Still referring to FIG. 6, optical means 304 produces an interference beam 322, carrying information about the change in optical path length between optical means 304 and stage 301 at two different wavelengths. Interference beam is divided according to wavelength by dichroic beamsplitter 370 into interference beams 323 and 322. An electronic system 328 and electronic system 329 generates heterodyne signals 358 and 359 from interference beams 323 and 322, respectively. Heterodyne signals 358 and 359 are processed by computer 310 to measure changes in the respective measurement paths for each of the two wavelengths.

Still referring to the multiple-wavelength arrangement in FIG. 6, the utility of using more than one wavelength of light simultaneously or in rapid sequence in the same interferometric system is that the measurement path length changes slightly with wavelength, as a consequence of refractive index dispersion. This dispersion phenomenon is indicative of the density of the gas in the measurement path. In that variations in gas density can lead to measurement errors, the use of two or more wavelengths provides a means of detecting and compensating such variations in density. Details of the technique, including extensive prior art references, may be found in U.S. Pat. No. 5,764,362 (Jun. 9, 1998) to H. A. Hill and P. de Groot, entitled "Superheterodyne method and apparatus for measuring the refractive index of air using multiple-pass interferometry".

There are also several ways that the entrance and exit beams can be divided and recombined, depending on the type of interferometer system. One can imagine, for example, an all-reflective system employing reflection gratings for beam separation and combination.

A general interferometric method in accordance with another aspect of the invention comprises the steps of:

fixedly mounting a beam redirecting means to a body for movement therewith in at least two orthogonal directions; and forming a reference path for a reference beam;

in combination with said beam redirecting means, forming a measurement path for a measurement beam having at least one incoming and one outgoing segment that travel, respectively, to and from said redirecting means and are spatially separated from one another, said measurement path changing in length as the body moves along a select one of said two orthogonal directions and being spatially separated from said reference path;

introducing reference and measurement beams for travel along said reference and measurement paths, respectively; and combining said reference and said measurement beams so that they are coextensive and have a predetermined angle between them to generate an interference signal that varies in accordance with changes in said measurement path, said redirecting means being configured and arranged with respect to said optical means so that said reference and measurement beams remain substantially coextensive with said predetermined angle between them as the body moves both along said select direction and orthogonal to said select direction.

The foregoing method may be used to precisely measure the position of various microlithographic apparatus in processes for fabricating integrated circuits such as computer chips and the lie. In such processes, the method may be used for measuring the position of a variety of microlithographic apparatus such as, but not limited to, wafer stages and masks as described more fully in, for example, "MICROLITHOGRAPHY, Science and Technology", Sheats, James R. and Smith, Bruce W., Marcel Dekker, (1998).

Figure 7:
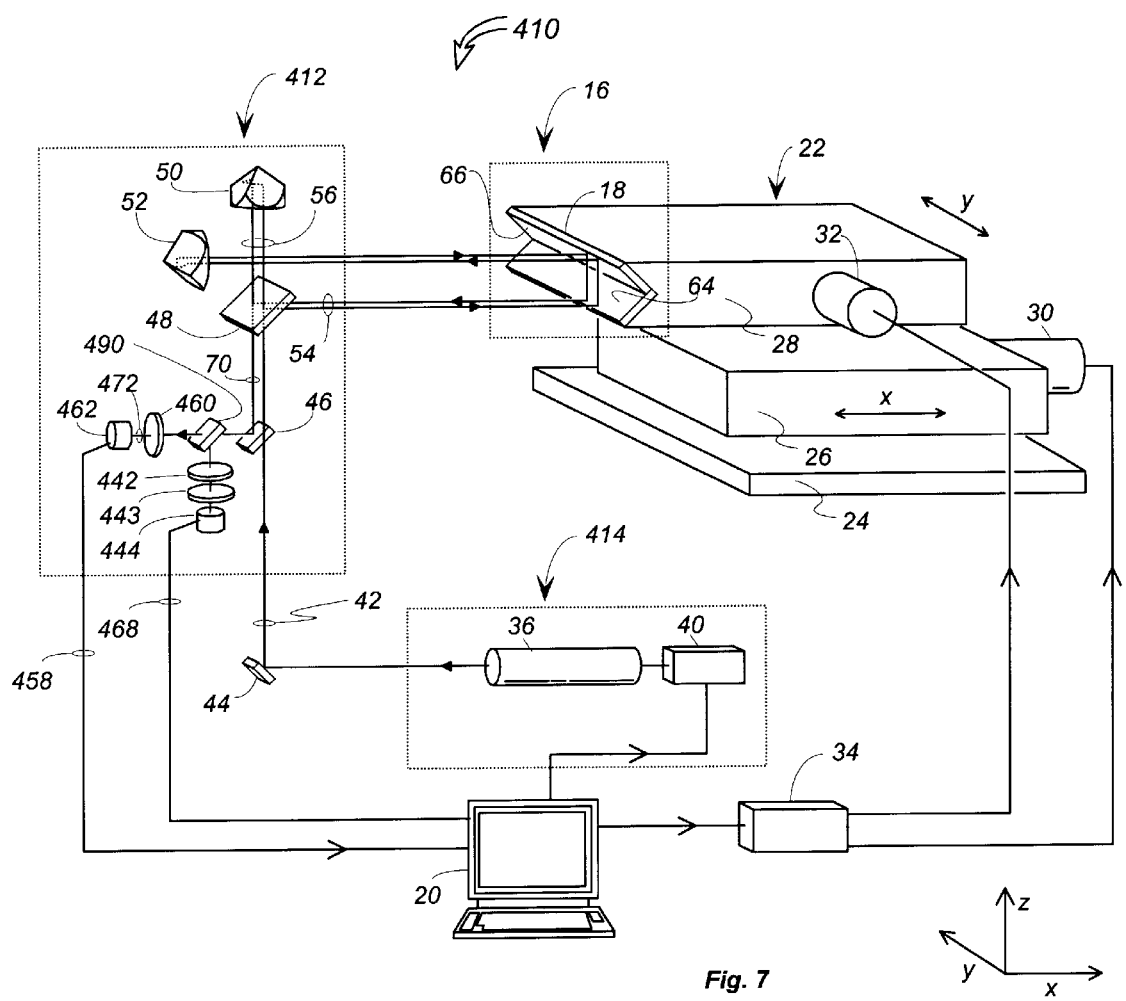
FIG. 7 is a diagrammatic perspective view of an apparatus of the invention employing a single wavelength source and homodyne processing.

Although the disclosed embodiments have employed primarily heterodyning techniques for phase measurement, it should be apparent from the disclosure that homodyne techniques may also be used to advantage in practicing the invention. An example of a simple homodyne system for practicing the invention is shown in FIG. 7 which utilizes many of the same parts as the embodiment of FIG. 1 so parts in common with FIG. 1 have retained the same numbering as in FIG. 1. Here, laser 36 generates an output beam containing s and p polarization components where the output beam of laser 36 is redirected to travel upwardly by fold mirror 44 as beam 445. Beam 445 is split by polarizing beamsplitter 48 into orthogonally polarized beams, 54 and 56, which serve, respectively, as the measurement and reference beams as before. Beams 54 and 56 are recombined by polarizing beam splitter 48, emerging from it as beam 70 which travels to fold mirror 46. Fold mirror 46 directs beam 70 to a non-polarizing beam splitter 490 that splits it into two substantially equal component beams. One of these components travels to a mixing polarizer 460 emerging from it as interference beam 472 which then travels to photodetector 462 emerging from photodetector 462 as electronic signal 458. The other component of beam 70 is sent through a quarter-wave retardation plate 442. After emerging from quarter-wave plate 442, beam 70, now delayed, passes through mixing polarizer 443 and then on to photodetector 444. Photodetector 444 generates electronic signal 468 that is in phase quadrature with respect to signal 458. Signals 458 and 468 are processed via computer 20 using well-known homodyne processing techniques.

As previously mentioned, the interferometric apparatus of the invention may be used to measure precision distances in microlithographic apparatus to fabricate large scale integrated circuits such as computer chips. As an example, interferometric apparatus 10 is shown forming part of a microlithographic scanner 500 in FIG. 8, and is used therein for precision placement of a wafer with respect to an exposure system. Here, stage 22 is used to position the wafer relative to an exposure station. As seen, scanner 500 comprises a frame 502 which carries other support structure and various components carried on those structures. A base 504 has mounted on top of it a lens housing 506 atop of which is mounted a reticle or mask stage 516 that is incrementally moved via a scanner arm 518 attached to the frame 502. Again, the invention may be used to precisely measure the position of exposure masks as well other moveable elements whose position must be accurately monitored in processes for fabricating microlithographic structures. (see supra Sheats and Smith MICROLITHOGRAPHY)

Suspended below base 504 is a "U"-shaped support 513 that carries stage 22. On stage 22 is beam redirecting means 18 as before and measurement beam 54 interacts with beam redirecting means as previously described. The remainder of interferometric apparatus 10 is mounted on base 504.

A light beam 512 from a UV laser (not shown) passes through a beam shaping optics assembly 512 and travels downward after reflecting from a fold mirror 514. The UV downwardly-traveling beam passes through a mask (not shown) carried by mask stage 516. Said mask (not shown) is imaged onto a wafer (not shown) on wafer stage 22 via a lens assembly 508 carried in a lens housing 506. Base 504 and the various components support from it are isolated from environmental vibrations by damping system shown in part as spring 520.

While interferometric apparatus 10 is shown in scanner500, it will be apparent the other embodiments of the invention may beneficially be used therein in similar fashion. Moreover, it will also be apparent that the various embodiments of the inventive apparatus may be used in such scanners to measure distance along multiple axes and angles as well.

Figure 8:
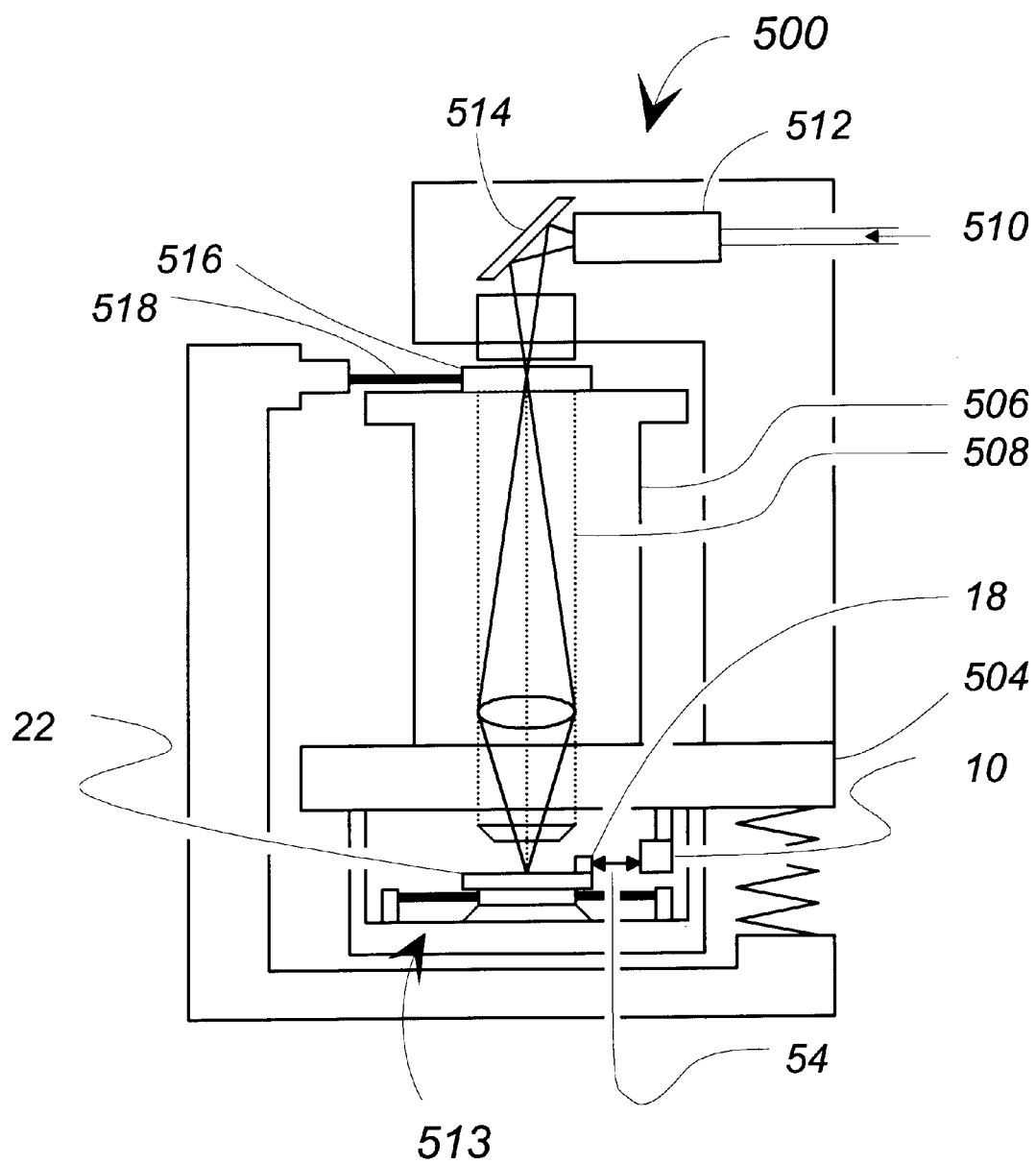
FIG. 8 is a diagrammatic elevational view of a microlithographic apparatus in which the present invention is shown incorporated.

Although FIG. 8 has been described in terms of an optical system for printing integrated circuit patterns, it will be apparent to those skilled in the art that the inventive apparatus may be employed in any type of microlithographic tool, including x-ray and electronic beam steppers and scanners.

Figure 9:
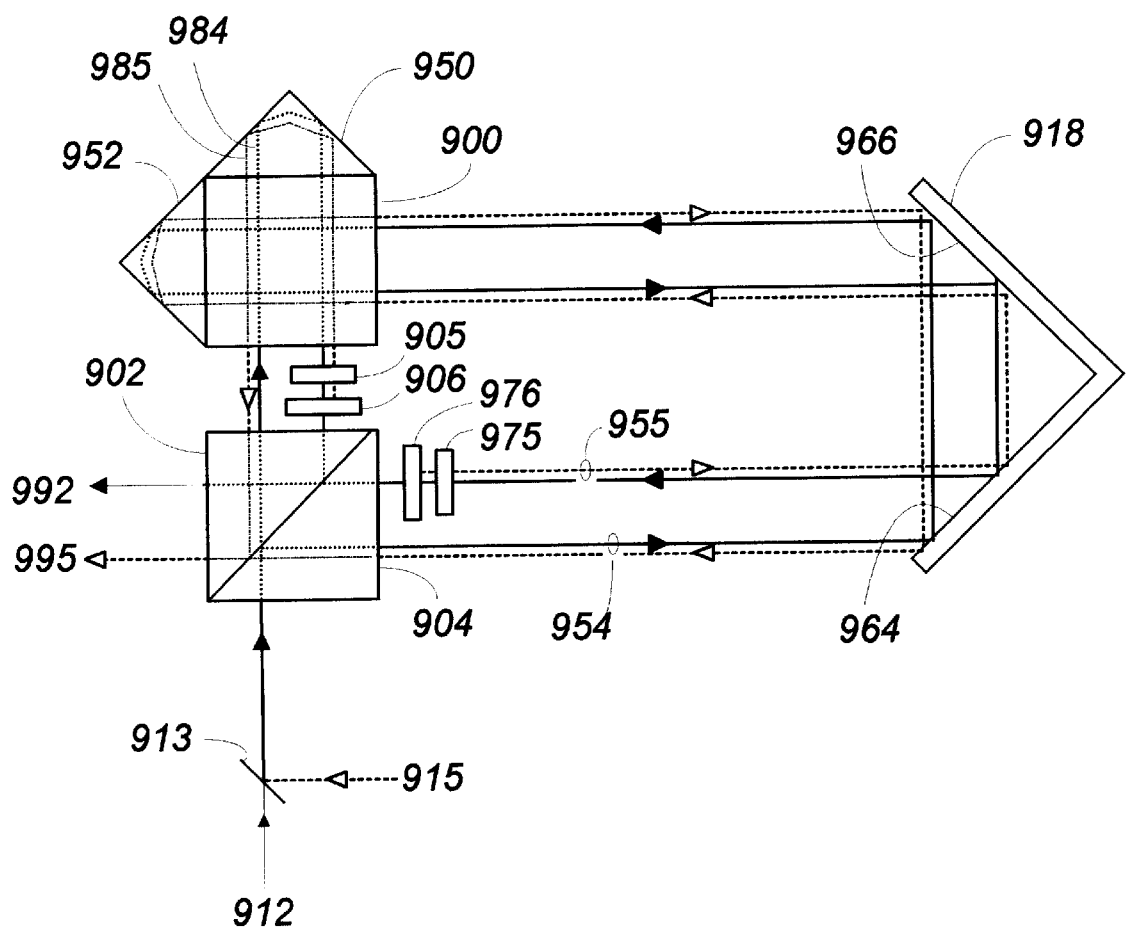
FIG. 9 is a diagrammatic view of an embodiment of the invention that utilizes multiple pass interferometry to compensate for refractive index effects in an optical path

As mentioned earlier, use of two or more operating wavelengths is often made in dispersion interferometric methodologies to compensate for refractive index fluctuations in the measurement path. Where scanner stage motions are sufficiently fast, even dispersion interferometric techniques become problematic because of the existence of doppler frequency differences that can prevent achieving desired precision in distance measurements. To compensate for such Doppler effects, the apparatus of FIG. 9 may be used in the practice of the invention. Here, the input source beams are provided in the manner of FIG. 6 and include a short wavelength beam 912 (e.g., a UV wavelength such as 316 nm) and a long wavelength beam 915 (e.g., a visible wavelength such as 633 nm). Both beams 912 and 915 contain orthogonally polarized components and are combined by a dichroic combiner 913 for travel along a common path to polarizing beamsplitter 901, which is composed of prismatic elements 902 and 904.

The beam thus combined is split by polarizing beamsplitter 901 into a measurement beam 954 and a reference beam 984. Measurement beam 954 travels to a beam redirection means 918 in the form of a roof mirror or prism. Beam 954 is reflected off a lower facet 964 of roof mirror 918 (attached to a measurement stage and/or scanner as described previously) to an upper facet 966 thereof, and from there, it is reflected through a transparent block 900 to a corner cube prism 952 from which it is retroreflected back along a path parallel and offset, e.g., spatially separated with respect to its incoming path and back to upper facet 966. From there, it passes through a wave plate 975 to a dichroic mirror 976. Wave plate 975 is so constructed as to provide quarter-wave retardation at the longer wavelength, and half-wave retardation at the shorter wavelength. Just prior to impinging on dichroic mirror 976, beam 954 still comprises both operating wavelengths. However, dichroic mirror 976 is structured to transmit the shorter of the two wavelengths while reflecting the longer wavelength as a beam 955 which travels back through the retardation wave 975 to lower facet 964, then to upper facet 966, then through block 900, and on to corner cube prism 952. From corner cube prism 952, beam 955 travels to upper facet 966, then to lower facet 964, and then through polarizing beamsplitter 901 from which it emerges from the measurement path as a component of optical beam 995.

Meanwhile, the shorter wavelength component of measurement beam 954 that has been transmitted by dichroic mirror 976 passes through polarizing beamsplitter 901 from which it emerges to form part of beam 992. Thus, the beam with the longer wavelength has traveled over the measurement path by a distance that is twice a long as that over which its shorter wavelength counterpart has traveled.

Reference beam 984, comprising both wavelengths, travels through block 900 to a corner cube prism 950 from which it is retroreflected along a path that is parallel to and offset with respect to its incoming path. After retroreflection, reference beam 984 travels through a waveplate 905and then to a dichroic mirror 906. Wave plate 905 is constructed in the same manner as wave plate 975, so that it provides quarter-wave retardation at the longer wavelength, and half-wave retardation at the shorter wavelength Dichroic mirror 906 transmits the shorter wavelength component of reference beam 984, and it is then reflected off the interface formed between prismatic elements 902 and 904 after which it emerges as a shorter wavelength component of optical beam 992.

The longer wavelength component of reference beam 984 that is reflected by dichroic mirror 906 passes back through retardation waveplate 905, block 900, and on to corner cube prism 950. From there, it is retroreflected along a parallel, but offset, path compared with its incoming path. Along this path, it travels to the interface of polarizing beamsplitter elements 902 and 904. From that interface, it is reflected to join beam 995, thus combining with the longer wavelength component thereof from the measurement path..

The wavelengths of sources 912 and 915 are preferably substantially harmonically related and the number of passes made by the shorter and longer wavelength beams in traveling over the measurement and reference paths is also harmonically related in the same ratio as are the wavelengths to compensate for what would otherwise amount to different doppler shifts with rapidly moving stages.

Output beams 992 and 995 are processed using well-known Superheterodyne techniques as more fully described, along with other details of the foregoing dispersion embodiment, in U.S. Pat. No. 5,764,362 issued on Jun. 9, 1998, the contents of which are incorporated herein in their entirety by reference.

Those skilled in the relevant arts will readily be able to construct other embodiments in accordance with the teaching of the invention and such variations are to be considered to be within the scope of the invention.

What is claimed is:
1. An interferometric apparatus for measuring the translation of a body while being insensitive to changes in pitch and yaw of the body as the body translates in mutually orthogonal directions, said interferometric apparatus comprising:

beam redirecting means adapted to be fixedly mounted to a body for translation therewith in at least two orthogonal directions; and optical means for:
(a) forming a reference path for a reference beam;
(b) in combination with said beam redirecting means, forming a measurement path for a measurement beam having at least two pairs of incoming and outgoing segments where each incoming and outgoing segment in each pair travels, respectively, to and from said redirecting means along different paths that are vertically separated one from the other in a first direction while each pair of segments is laterally separated from one another in a direction orthogonal to said first direction, said measurement path changing in length as the body moves along a select one of said two orthogonal directions and being spatially separated from said reference path;
(c) introducing reference and measurement beams for travel along said reference and measurement paths, respectively; and
(d) combining said reference and said measurement beams so that they are coextensive and have a predetermined angle between them to generate an interference signal that varies in accordance with changes in said measurement path, said redirecting means being configured and arranged with respect to said optical means so that said reference and measurement beams remain substantially coextensive with said predetermined angle between them as the body moves both along said select direction and orthogonal to said select direction whereby said interference signal is insensitive to changes in pitch and yaw of said body as it moves in said two orthogonal directions.

2. The interferometric apparatus of claim 1 wherein said beam redirecting means is selected from the group consisting of roof mirrors, prisms, diffractive elements, holographic elements, and combinations thereof.

3. The interferometric apparatus of claim 1 wherein said beam redirecting means comprises a roof mirror having plano reflecting surfaces arranged at 90 degrees with respect to one another.

4. The interferometric apparatus of claim 1 wherein said optical means comprises a polarizing beamsplitter and at least a pair of reflecting elements selected from the group consisting of roof mirrors, retroreflectors, diffractive elements, and holographic elements.

5. The interferometric apparatus of claim 4 wherein said pair of reflecting elements comprise a pair of retroreflectors one of which, in combination with said polarizing beamsplitter, comprises said reference path and the other of which, in combination with said polarizing beamsplitter and said beam redirecting means, comprises said measurement path.

6. The interferometric apparatus of claim 5 wherein said polarizing beamsplitter comprises a pair of prismatic elements, one of said prismatic elements having one of said retroreflectors affixed thereto and the other of said prismatic elements having the other of said retroreflectors affixed thereto.

7. The interferometric apparatus of claim 6 wherein one of said retroreflectors is common to both said reference and said measurement paths.

8. The interferometric apparatus of claim 1 further including an X-Y translation stage to which said beam redirecting means is fixedly attached for movement therewith.

9. The interferometric apparatus of claim 1 further including microlithographic apparatus to which said beam redirecting means is attached for movement therewith to monitor the position of said microlithographic apparatus to fabricate integrated circuits.

10. The interferometric apparatus of claim 8 wherein said translation stage comprises at least a part of a microlithographic apparatus.

11. The interferometric apparatus of claim 8 further including means for moving said X-Y translation stage.

12. The interferometric apparatus of claim 1 further including means for generating at least two beams of radiation for travel along said reference and said measurement paths, respectively.

13. The interferometric apparatus of claim 1 further including at least two sources of radiation having different operating wavelengths, each of said at least two sources of radiation generating a reference beam and a measurement beam for travel along said reference and measurement paths, respectively.

14. The interferometric apparatus of claim 12 wherein said reference beams are orthogonally polarized with respect to said measurement beams.

15. The interferometric apparatus of claim 14 further including means for introducing a frequency difference between selected ones of said reference beams and said measurement beams to generate therefrom a set of frequency shifted beams for subsequent downstream heterodyne processing.

16. The interferometric apparatus of claim 12 wherein said reference beams are spatially separated with respect to said measurement beams.

17. The interferometric apparatus of claim 1 further including a source of radiation for generating a beam of radiation having a single operating wavelength.

18. The interferometric apparatus of claim 17 wherein said optical means includes means for receiving and splitting said beam of radiation into two beams such that a reference beam, travels along said reference path and a measurement beam travels along said measurement path.

19. The interferometric apparatus of claim 17 wherein said optical means splits said beam of radiation in such a manner that said measurement beam and said reference beam are orthogonally polarized with respect to each other.

20. The interferometric apparatus of claim 19 further including homodyne means for determining the the phase difference between the measurement and reference beams.

21. The interferometric apparatus of claim 19 further including means for introducing a frequency difference between said reference and said measurement beams prior to their traveling along said reference and measurement paths for subsequent downstream heterodyne processing.

22. The interferometric apparatus of claim 19 further including means for introducing a frequency difference between said reference and said measurement beams after they travel along said reference and measurement paths for subsequent downstream heterodyne processing.

23. The inteferometric apparatus of claim 11 wherein said beams of radiation are orthogonally polarized with respect to one another and differ in frequency.

24. The interferometric apparatus of claim 23 wherein said means for generating said orthogonally polarized reference and measurement beams comprises a laser and a modulator for shifting the frequency of at least a portion of the output of said laser for subsequent downstream heterodyne processing.

25. The interferometric apparatus of claim 23 wherein said optical means comprises means for mixing said orthogonally polarized reference and measurement beams, said mixing means being a plane polarizer arranged at 45 degrees with respect to the polarization axes of said reference and measurement beams.

26. The interferometric apparatus of claim 1 further comprising a second optical means, identical to said first optical means, arranged so that said interferometric apparatus measures angular displacements of a body in motion.

27. An interferometric method for measuring the translation of a body while being insensitive to pitch and yaw of the body as the body translates in mutually orthogonal directions, said interferometric method comprising the steps of:
fixedly mounting a beam redirecting means to a body for translation therewith in at least two orthogonal directions; and
forming a reference path for a reference beam;
in combination with said beam redirecting means, forming a measurement path for a measurement beam having at least two pairs of incoming and outgoing segments where each incoming and outgoing segment in each pair travels, respectively, to and from said redirecting means along different paths that are vertically separated in a first direction while each pair of segments is laterally separated from one another in a direction orthogonal to that of said first direction, said measurement path changing in length as the body moves along a select one of said two orthogonal directions and being spatially separated from said reference path;
introducing reference and measurement beams for travel along said reference and measurement paths, respectively; and
combining said reference and said measurement beams so that they are coextensive and have a predetermined angle between them to generate an interference signal that varies in accordance with changes in said measurement path, said redirecting means being configured and arranged with respect to said optical means so that said reference and measurement beams remain substantially coextensive with said predetermined angle between them as the body moves both along said select direction and orthogonal to said select direction whereby said interference signal is insensitive to changes in the pitch and yaw of said body as it moves in said two orthogonal directions.

28. The interferometric method of claim 27 wherein said beam redirecting means is attached to microlithographic apparatus to monitor the position thereof to fabricate integrated circuits.

29. The interferometric method of claim 28 wherein said microlithographic apparatus is selected from the group consisting of wafer stages and exposure masks.

30. The interferometric method of claim 27 wherein said beam redirecting means is selected from the group consisting of roof mirrors, prisms, diffractive elements, holographic elements, and combinations thereof.

31. The interferometric method of claim 27 wherein said beam redirecting means comprises a roof mirror having piano reflecting surfaces arranged at 90 degrees with respect to one another.

32. The interferometric method of claim 27 wherein said optical means comprises a polarizing beamsplitter and at least a pair of reflecting elements selected from the group consisting of roof mirrors, retroreflectors, diffractive elements, and holographic elements.

33. The interferometric method of claim 32 wherein said pair of reflecting elements comprise a pair of retroreflectors one of which, in combination with said polarizing beamsplitter, comprises said reference path and the other of which, in combination with said polarizing beamsplitter and said beam redirecting means, comprises said measurement path.

34. The interferometric method of claim 27 further including the step of providing of an X-Y translation stage to which said beam redirecting means is fixedly attached for movement therewith.

35. The interferometric method of claim 34 further including the step of moving said X-Y translation stage.

36. The interferometric method of claim 35 wherein said translation stage comprises at least a part of a microlithographic apparatus.

37. The interferometric method of claim 27 further including the step of providing at least two sources of radiation having different operating wavelengths, each of said at least two sources of radiation generating a reference beam and a measurement beam for travel along said reference and measurement paths, respectively.

38. The interferometric method of claim 37 wherein said reference beams are orthogonally polarized with respect to said measurement beams.

39. The interferometric method of claim 38 further including the step of introducing a frequency difference between selected ones of said reference beams and said measurement beams to generate therefrom a set of frequency shifted beams for subsequent downstream heterodyne processing.

40. The interferometric method of claim 37 wherein said reference beams are spatially separated with respect to said measurement beams.

41. The interferometric method of claim 27 further including providing a source of radiation for generating a beam of radiation having a single operating wavelength and orthogonally polarized states.

42. The interferometric method of claim 41 further including the step of receiving and splitting said beam of radiation into orthogonally polarized beams such that one of said orthogonally polarized beams travels along said reference path and the remaining one along said measurement path.

43. The interferometric method of claim 42 further including the step of introducing a frequency difference between said orthogonally polarized beams prior to their traveling along said reference and said measurement paths for subsequent downstream heterodyne processing.

44. The inteferometric method of claim 27 wherein said beams of radiation are orthogonally polarized with respect to one another and differ in frequency.

45. The interferometric method of claim 44 wherein said step of generating said orthogonally polarized reference and measurement beams comprises providing a laser and a modulator for shifting the frequency of at least a portion of the output of said laser.

46. The interferometric method of claim 45 further including the step of mixing said orthogonally polarized reference and measurement beams a plane polarizer arranged at 45 degrees with respect to the polarization axes of said reference and measurement beams.

47. A distance measuring interferometer for measuring the translation of a body while being insensitive to changes in the pitch and yaw of the body as the body translates in mutually orthogonal directions, said distance measuring interferometer comprising:

an X-Y translation stage;

means for moving said X-Y translation stage along both X and Y directions;

means for generating at least two spatially separated beams of radiation one of which is a measurement beam and the other of which is a reference beam;

first beam redirecting means fixedly mounted with respect to said X-Y translation stage;

second beam redirecting means mounted for movement with said X-Y translation stage;

said first and second beam redirecting means being configured and arranged with respect to one another to intercept both said reference and measurement beams at least twice and redirect them through an angle of deviation of 180 degrees alone separate paths as reflected reference and measurement beam segments, respectively, that are spatially separated from one another such that the physical path over which said reference beam travels does not change with movement of said X-Y translation stage while the physical path over which said measurement beam travels changes in accordance with the X-translation of said X-Y translation stage and is independent of its Y-translation, pitch and yaw, said reflected reference and measurement beam segments remaining spatially separated as they emerge from said first and second reflection means, said measurement beam segments comprising at least two pairs of incoming and outgoing beam segments where each beam segment in a pair is spatially separated along a first direction and each pair of beam segments is spatially separated from the other along a direction that is orthogonal to said first direction; and means for combining said reflected reference and measurement beam segments so that they are coextensive to generate an interference signal that varies in accordance with changes in said measurement path, said first and second redirecting means being configured and arranged with respect to one another so that said reference and measurement beams remain substantially coextensive as said X-Y translation stage moves along both said X and Y directions whereby said interference signal is insensitive to changes of pitch and yaw of the body as it translates.

48. The distance measuring interferometer of claim 47 wherein said first and second redirecting means comprise retroreflectors.

49. The distance measuring interferometer of claim 48 wherein said retroreflectors comprise two plano mirrors arranged at 90 degrees with respect to one another.

50. The distance measuring interferometer of claim 48 wherein each of said retroreflectors comprise a Porro prism.

51. The distance measuring interferometer of claim 48 wherein said first redirecting means comprises two retroreflectors.

52. The distance measuring interferometer of claim 47 wherein said means for generating at least two spatially separated beams of radiation comprises a laser.

53. The distance measuring interferometer of claim 52 further including a modulator for modulating said laser for subsequent downstream heterodyne detection.

54. The distance measuring interferometer of claim 47 wherein said means for generating at least two spatially separated beams of radiation comprises two lasers each operating at different wavelengths.

* * * * *